Nov. 17, 1959    R. D. SNOW ET AL    2,912,944
LIQUID FERTILIZER APPLICATOR VEHICLE
Filed June 6, 1955

INVENTORS
R. D. SNOW
J. H. HUGHES
BY Hudson & Young
ATTORNEYS

United States Patent Office
2,912,944
Patented Nov. 17, 1959

2,912,944
LIQUID FERTILIZER APPLICATOR VEHICLE

Robert D. Snow and James H. Hughes, Bartlesville, Okla., assignors to Phillips Petroleum Company, a corporation of Delaware Application June 6, 1955, Serial No. 513,549

2 Claims. (Cl. 111—7)

This invention relates to improved equipment for applying fertilizer to the soil. A specific aspect of the invention is concerned with an improved applicator vehicle for introducing a fluid fertilizer, such as anhydrous ammonia, into the soil.

It is well known that anhydrous ammonia applied directly to the soil is an effective fertilizer. Equipment has been designed and constructed for the application of the ammonia by using a colter to break the soil, a nozzle following close behind the colter, and a packer wheel to close the soil behind the injection nozzle. More recently it has been discovered that high pressure injection of the ammonia is effective in obtaining maximum ammonia penetration with a minimum amount of soil working. The equipment previously designed and constructed for the application of ammonia requires some type of injection-device lifting equipment since the ammonia injection equipment must be lifted each time the machine is turned to prevent damaging and destructive side loads on the equipment. Our invention relates to improved ammonia application equipment which permits short radius turns to be made without lifting the injection equipment from the ground.

The principal object of the invention is to provide an improved applicator vehicle for introducing fertilizer into the soil and particularly adapted for the high pressure application of anhydrous ammonia. Another object of the invention is to provide an improved applicator vehicle which can be operated without lifting the injection equipment from the ground when making short turns. Other objects of the invention will become apparent from a consideration of the accompanying disclosure.

This invention comprises a vehicle for injecting a readily flowable or fluid fertilizer into the soil wherein the injecting equipment, comprising a ground-breaking member or colter, an injection nozzle close behind a leading section of the colter, and a packer wheel positioned in line with the center line of the supporting wheels of the vehicle, need not be raised in making short turns of the vehicle. The invention permits even short radius turns without lifting the injecting equipment from contact with the ground. The term "fluid fertilizer" as used herein includes any readily flowable fertilizer or soil improver in liquid, solid, or gaseous form.

Figure 1:
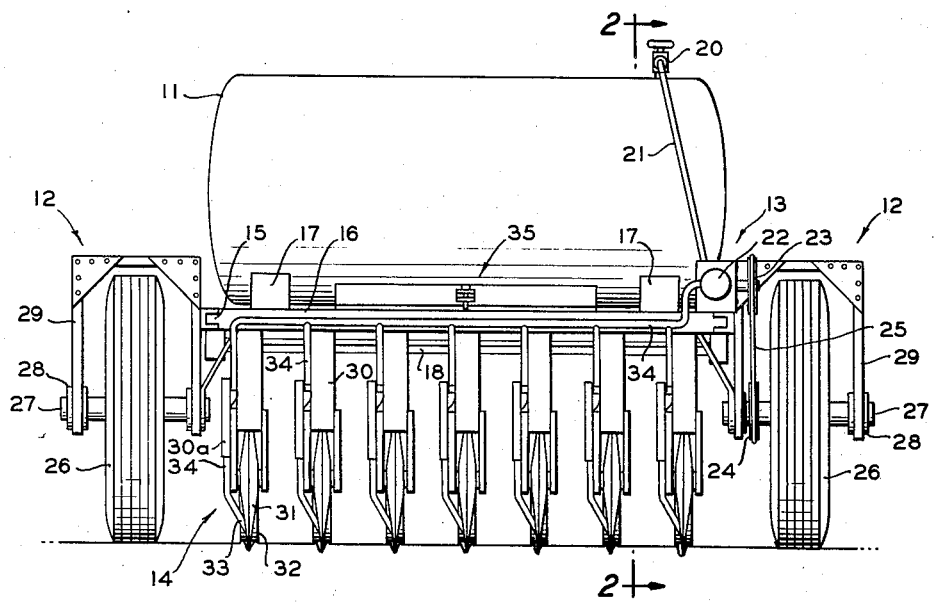
Figures 2, 4:
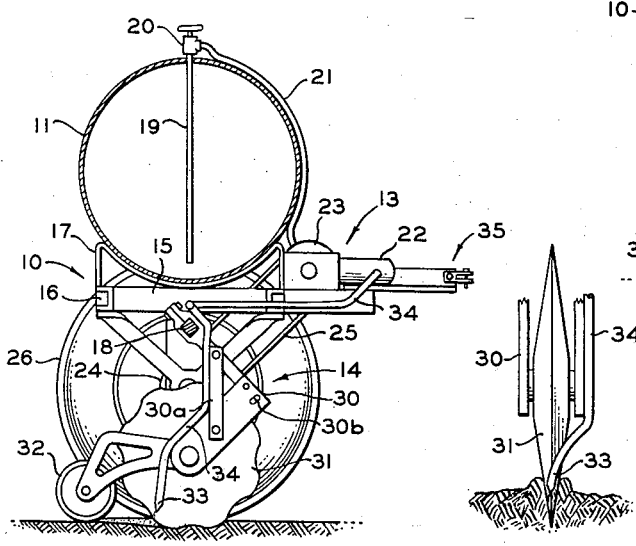
Figure 3:
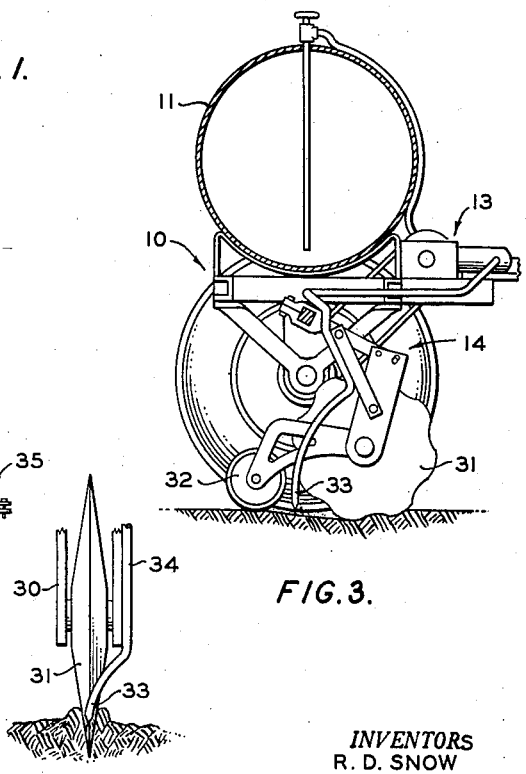

A more complete understanding of the invention may be obtained by reference to the accompanying drawing of which Figure 1 is an elevation of one embodiment of the invention; Figure 2 is a transverse cross section of the device of Figure 1 taken on the line 2—2; Figure 3 illustrates a second embodiment of the invention in which the ammonia nozzle follows directly behind the colter; and Figure 4 illustrates the relation of the ammonia injection nozzle to the cut made by the colter in the embodiment illustrated in Figure 3.

The ammonia applicator illustrated in Figures 1 and 2 comprises a frame 10, an ammonia tank 11, running gear 12, pump and drive assembly 13, and ammonia applicator unit 14. Frame 10 comprises cross members 15, longitudinal members 16, tank supports 17 and tool bar 18. Ammonia tank 11 is provided with eduction tube 19, valve 20, and line 21 to assembly 13. It is understood that tank 11 ordinarily is provided with the usual fill valves, safety valves, etc., as well known in the art. Assembly 13 comprises a pump 22 driven by pulleys 23 and 24, and belt 25. Pulley 24 is attached to axle 27 of wheel 26 which, together with bearing 28, and wheel frame 29 comprises running gear 12. Ammonia applicator unit 14 comprises a support assembly 30, clamped to tool bar 18 and supporting colter 31, packing wheel 32, and ammonia injection nozzle 33. Nozzle 33 is connected with pump 22 by tubing 34. As illustrated in Figure 3, nozzle 33, which is behind the center line of colter 31, rides in the open cut made by colter 31. A plurality of ammonia applicator units 14 are normally provided. A hitch assembly 35 is provided for attaching to a tractor or other pulling equipment.

In Figures 1 and 2 a vertical plane passing thru axles 27 of support wheels 26 passes thru the axis of each colter, while in Figures 3 and 4 said vertical plane passes thru the colter or applicator assembly. Applicator nozzle 33, as shown in Figure 4, delivers fertilizer directly to the furrow formed by colter 31.

It is desirable in most instances to provide adjusting means and/or resilient supports for the ammonia injection equipment. For example, tool bar 18 can be supported in suitable bearings and provided with adjustable rotating means to allow the injection equipment to be raised and lowered when traveling from one field to another. Sufficient flexibility can be provided by using a resilient link in the adjustable rotating means or by providing a pivot at 30b and substituting an adjustable resilient link, such as a compression spring, for stiff brace 30a.

Since the center line or axle of colter 31 is in a vertical plane passing through the center line or axle of wheels 26 or through the applicator assembly, short radius turns can be made without applying any appreciable side load to the colters. In making short radius turns, there is less strain on the applicator assembly, particularly colter 31, when the axis of this colter is in aforesaid vertical plane. Obviously, no side load can be applied to nozzle 33 which is protected by colter 31. Packing wheel 32 follows closely behind colter 31 thus minimizing the side load on this member.

In the embodiment of the invention illustrated in Figure 4, nozzle 33 is positioned directly behind colter 31, in the space between colter 31 and packing wheel 32. In this modification it is desirable to place the nozzle in or near the vertical plane passing through the center line of wheels 26.

Colter 31 may be of any suitable type, such as that with undulated edge as shown, a convexo-concave disk, or a plain wedge-shaped circular disk, the essential feature being that the colter opens the ground and protects the injector nozzle.

Certain modifications of the invention will become apparent to those skilled in the art and the illustrative details disclosed are not to be construed as imposing unnecessary limitations on the invention.

We claim:

1. A liquid fertilizer applicator vehicle comprising in combination an elongated supporting frame having mounted at opposite ends a pair of supporting wheels; a liquid storage and dispensing container in the form of a closed tank mounted on said frame; a support bar attached to the underside of said frame extending substantially the length thereof; a plurality of applicator assemblies suspended from said support bar, each comprising a disk-type rotatable colter of substantial thickness at the center and tapering to a thin edge at the circumference, whereby said colter cuts a V-shaped furrow in the ground during forward movement of said vehicle, support means on said bar for supporting said colter parallel with said wheels in contact with the ground and positioned so that a vertical plane passing through the center of said wheels passes through said colter, an applicator nozzle positioned behind a leading section of said colter and extending to a level adjacent the lowermost section of said colter so that fertilizer passing through said nozzle is delivered directly into said furrow, and a packing wheel mounted on each said assembly directly behind and adjacent the back edge of said colter; a liquid tight header conduit running transversely of said applicator assemblies and extending between points above and opposite the outermost applicators; a supply line connecting said header with said tank; a liquid pump in said supply line for delivering liquid from said tank to said header; a liquid tight conduit connecting each said nozzle with said header; and means for driving said pump.

2. The vehicle of claim 1 wherein said pump in said supply line has operating means operatively connected with a drive member attached to one of said supporting wheels.

References Cited in the file of this patent

UNITED STATES PATENTS

| | | |
|---|---|---|
| 369,859 | Johnson | Sept. 13, 1887 |
| 1,556,850 | Kuhne | Oct. 13, 1925 |
| 1,661,305 | Roberts | Mar. 6, 1928 |
| 1,924,075 | Olson | Aug. 22, 1933 |
| 2,155,443 | Parks et al. | Apr. 25, 1939 |
| 2,159,652 | Brunner | May 23, 1939 |
| 2,175,356 | Maly | Oct. 10, 1939 |
| 2,594,284 | Blue | Apr. 29, 1952 |
| 2,704,524 | McIntyre | Mar. 22, 1955 |
| 2,722,902 | Hyatt | Nov. 8, 1955 |

FOREIGN PATENTS

| | | |
|---|---|---|
| 23,036/29 | Australia | Mar. 28, 1930 |

OTHER REFERENCES

Beacher: Anhydrous Ammonia, November 5, 1953; this article reprinted from May 1953 issue of The Arkansas Farmer, 4 pages.